US011134739B1

(12) United States Patent
Jin et al.

(10) Patent No.: US 11,134,739 B1
(45) Date of Patent: Oct. 5, 2021

(54) MULTI-FUNCTIONAL WEARABLE DOME ASSEMBLY AND METHOD OF USING THE SAME

(71) Applicants: Yifei Jenny Jin, Beijing (CN); Naixin Angela Tang, Beijing (CN); Liangxi Nick Chen, Beijing (CN); Songhe Bill Shen, Beijing (CN); Lisa Ruosha Wang, Belle Mead, NJ (US); Richard Prince Wang, Belle Mead, NJ (US); Jian Jim Wang, Belle Mead, NJ (US); Qing Ye, Los Gatos, CA (US)

(72) Inventors: Yifei Jenny Jin, Beijing (CN); Naixin Angela Tang, Beijing (CN); Liangxi Nick Chen, Beijing (CN); Songhe Bill Shen, Beijing (CN); Lisa Ruosha Wang, Belle Mead, NJ (US); Richard Prince Wang, Belle Mead, NJ (US); Jian Jim Wang, Belle Mead, NJ (US); Qing Ye, Los Gatos, CA (US)

(73) Assignees: Yifei Jenny Jin, Beijing (CN); Naixin Angela Tang, Beijing (CN); Liangxi Nick Chen, Beijing (CN); Songhe Bill Shen, Beijing (CN); Lisa Ruosha Wang, Belle Mead, NJ (US); Richard Prince Wang, Belle Mead, NJ (US); Jian Jim Wang, Belle Mead, NJ (US); Qing Ye, Los Gatos, CA (US)

( * ) Notice: Subject to any disclaimer, the term of this patent is extended or adjusted under 35 U.S.C. 154(b) by 0 days.

(21) Appl. No.: 17/213,233

(22) Filed: Mar. 26, 2021

Related U.S. Application Data

(60) Provisional application No. 63/199,700, filed on Jan. 19, 2021.

(51) Int. Cl.
*H04M 1/00* (2006.01)
*A42B 3/06* (2006.01)
(Continued)

(52) U.S. Cl.
CPC ............... *A42B 3/06* (2013.01); *A42B 3/30* (2013.01); *A62B 18/045* (2013.01);
(Continued)

(58) Field of Classification Search
CPC .. A42B 3/06; A42B 3/30; A42B 3/044; A42B 3/0453; A42B 3/046; A42B 3/286;
(Continued)

(56) References Cited

U.S. PATENT DOCUMENTS 6,101,256 A * 8/2000 Steelman ............... H04R 5/023
381/122
6,176,239 B1 * 1/2001 Grove .................... A62B 18/02
128/201.15

(Continued)

*Primary Examiner* — Solomon G Bezuayehu
(74) *Attorney, Agent, or Firm* — Treasure IP Group, LLC (57) ABSTRACT

A flexible method to provide a variety of value-added coatings to a piece of jewelry or a group of jewelries is disclosed. Atomic Layer Deposition (ALD) and Molecular Layer Deposition (MLD) technique is implemented to deposit a layer of conformal coating on intended jewelry surfaces, including both exterior and interior surfaces, to enhance a vast majority of process-driven or end of use driven properties. The coating compositions include dielectrics material, metals, organic materials or organic-inorganic hybrid materials. The method steps of forming a layer of coating are straightforward and can be tailed to different purposes.

19 Claims, 10 Drawing Sheets

US 11,134,739 B1
Page 2

(51) Int. Cl.
| | |
|---|---|
| *A42B 3/30* | (2006.01) |
| *H04B 1/3827* | (2015.01) |
| *H04M 1/05* | (2006.01) |
| *H04M 1/60* | (2006.01) |
| *H04M 1/19* | (2006.01) |
| *G02B 27/01* | (2006.01) |
| *H04R 1/10* | (2006.01) |
| *A62B 18/04* | (2006.01) |
| *H04M 1/72409* | (2021.01) |
| *H04M 1/72454* | (2021.01) |
| *A42B 3/28* | (2006.01) |
| *A42B 3/04* | (2006.01) |
| *A62B 23/02* | (2006.01) |
| *G10K 11/162* | (2006.01) |

(52) U.S. Cl.
CPC ..... *G02B 27/0172* (2013.01); *G02B 27/0176* (2013.01); *H04B 1/385* (2013.01); *H04M 1/05* (2013.01); *H04M 1/19* (2013.01); *H04M 1/6066* (2013.01); *H04M 1/72409* (2021.01); *H04M 1/72454* (2021.01); *H04R 1/10* (2013.01); *A42B 3/044* (2013.01); *A42B 3/046* (2013.01); *A42B 3/0453* (2013.01); *A42B 3/286* (2013.01); *A62B 23/02* (2013.01); *G02B 27/01* (2013.01); *G02B 2027/0138* (2013.01); *G10K 11/162* (2013.01); *H04B 2001/3866* (2013.01)

(58) Field of Classification Search
CPC ......... H04M 1/72454; H04M 1/72409; H04M 1/19; H04M 1/6066; H04M 1/05; A62B 18/045; A62B 23/02; H04R 1/10; G02B 27/0172; G02B 27/0176; G02B 27/01; G02B 2027/0138; H04B 1/385; G10K 11/162

See application file for complete search history.

(56) References Cited

U.S. PATENT DOCUMENTS

| | | | | |
|---|---|---|---|---|
| 6,681,765 | B2 * | 1/2004 | Wen | A62B 18/02 128/201.25 |
| 7,152,600 | B2 * | 12/2006 | Freriks | A62B 17/04 128/205.27 |
| 7,534,005 | B1 * | 5/2009 | Buckman | A61F 9/068 2/8.2 |
| 8,282,234 | B2 * | 10/2012 | VanDerWoude | A62B 17/04 362/106 |
| 9,418,675 | B2 * | 8/2016 | Zhu | G10L 21/0208 |
| 10,028,544 | B2 * | 7/2018 | Teetzel | A42B 3/221 |
| 10,193,588 | B2 * | 1/2019 | Volmer | H04R 1/1008 |
| 10,603,527 | B2 * | 3/2020 | Namm | A61B 5/7405 |
| 10,779,604 | B2 | 9/2020 | Lebel et al. | |
| 10,796,681 | B2 | 10/2020 | Zukowski et al. | |
| 10,799,726 | B2 | 10/2020 | Graziani et al. | |
| 10,806,204 | B2 | 10/2020 | Pritz | |
| 10,841,567 | B2 | 11/2020 | Zhou et al. | |
| 10,849,384 | B2 | 12/2020 | Johnson et al. | |
| 10,897,947 | B2 | 1/2021 | Zheng et al. | |
| 2005/0117771 | A1 * | 6/2005 | Vosburgh | H04S 1/002 381/376 |
| 2007/0028372 | A1 * | 2/2007 | VanDerWoude | A62B 17/04 2/457 |
| 2008/0242984 | A1 * | 10/2008 | Oakley | G10K 11/002 600/442 |
| 2014/0190476 | A1 * | 7/2014 | Stinton | A62B 17/04 128/201.23 |
| 2014/0333773 | A1 * | 11/2014 | Davis | G06F 1/163 348/158 |
| 2015/0257734 | A1 * | 9/2015 | Chaggares | A61B 8/4272 600/447 |
| 2016/0189391 | A1 * | 6/2016 | Demartin | H04N 5/23296 382/103 |
| 2016/0242736 | A1 * | 8/2016 | Freiburg | A61B 17/2251 |
| 2017/0065016 | A1 * | 3/2017 | Chuback | A63B 71/12 |
| 2017/0080262 | A1 * | 3/2017 | Freres | A62B 18/025 |
| 2017/0127746 | A1 * | 5/2017 | Pietrzak | A42B 3/042 |
| 2017/0288718 | A1 * | 10/2017 | Rudrappa | H04M 1/05 |
| 2017/0332171 | A1 * | 11/2017 | Kim | G10K 11/17853 |
| 2018/0007994 | A1 * | 1/2018 | Boesen | A42B 3/30 |
| 2018/0132550 | A1 * | 5/2018 | Czajka | A62B 18/045 |
| 2019/0175960 | A1 * | 6/2019 | Awiszus | A61F 9/067 |
| 2020/0001388 | A1 * | 1/2020 | Sumner | B23K 9/322 |
| 2020/0100552 | A1 * | 4/2020 | Jaeger | A42B 3/048 |
| 2020/0128902 | A1 * | 4/2020 | Brown | A42B 3/30 |
| 2020/0198715 | A1 * | 6/2020 | Safai | B62J 45/41 |
| 2020/0349377 | A1 * | 11/2020 | Di | G06F 3/011 |
| 2021/0045486 | A1 * | 2/2021 | Park | A42B 3/30 |

* cited by examiner

To illustrate the phone can be connected on the outside

Figure 5
With a window opening directly open to the outside

Figure 7

Can directedly interact with a different device

Figure 6

Can directedly interact with a similar device

Figure 9

Additional skeleton needed?

MULTI-FUNCTIONAL WEARABLE DOME ASSEMBLY AND METHOD OF USING THE SAME

CROSS REFERENCE

Present invention takes priority from a provisional application 63/199,700, filed on Jan. 19, 2021. The provisional application is incorporated herein in its entirety.

TECHNICAL FIELD

The disclosed embodiments relate generally to a selective sound reduction and noise cancellation device, more particularly, to wearable devices made of sound damping materials in a shape more or less like a dome, being embedded with an earphone, a microphone and a wireless communication and control module.

BACKGROUND

As many electronic devices such as cameras, earphones, microphones, sensors and wireless communication modules become more and more compact and affordable, the integration development on forefront of the wearable electronics can help realizing many previously unthink of applications. For example, many personal sport equipment has been invented to protect a human head from physical injury, when embedded with electronics devices and batteries, turn to be an amazing data collecting equipment, through which many people can experience what the wearer of the personal dome assembly is seeing, hearing even feeling. There has been a growing need for a personal wear-on device, which can offer some essential functions which are not available or all available in the existing products or inventions.

At the same time, the COVID-19 pandemic in year 2020 and 2021, calls for personal wear-on devices, on one hand offering additional virus and hazard protection. Furthermore, considering future threat from chemical and biological hazard and future virus and air-borne diseases, an urgent need appears to have such a personal wear-on device which offer full protection from virus, air-borne threat, air pollution, bio- and chemical hazard from inhaling.

On the other hand, recent pandemic has changed the way how professionals at work and students at school interact and communicate. For some families, house has unexpectedly become an international call center, however, not every house is equipped with enough rooms and decent sound isolation for every member in the household. In school, under the hybrid teaching mode, even students and teacher interaction are on campus but the class room interactions are also through zoom. In order to avoid echoes or live interactions, students sometimes would have to step outside of the classroom with their devices to deliver speeches and answer questions.

This change in the era also calls for a personal wearable device offering simultaneous and selective sound management. So, anyone can wear it on and to private video call and phone calls, in a call center without interference, echoes, or worrying about disturbing others.

In view of the foregoing, there is a need for multifunctional wearable electronic device equipped with sound isolation capability with a broad variety of all wireless communication capabilities.

SUMMARY OF THE INVENTION

The present invention offers a new personal wearable sound management device which offers a broad variety of additional functions and capabilities including biological and chemical protection, and enhanced personal enjoyment. The personal wearable sound management device is a dome assembly.

It is a primary object of the present invention, to provide a dome assembly that offer excellent sound management in a private communication space. Excellent sound management includes a first scenario that a user can talk in any environment to avoid background noise to interfere the conversation or for the background noise to be sent to the receiver; and a second scenario that a user can talk in any environment to prevent non-intended audience from hearing what was conveyed by the user.

It is another primary object of the present invention, to provide a safe individual environment for a user. The dome assembly can protect a user from shock and/or physical damage to the head or shoulder of the user. Furthermore, dome assembly can prevent a user's accidental exposure to noise, air pollution, chemical and biological toxins like COVID-19.

It is another primary object of the present invention, with the placement of the dome assembly, a user does not need to sacrifice any of the live interaction communication features instead to provide a customized environmental for a user. The dome assembly provide an individually controlled temperature, air control and offer a variety communication module to the user to enhance comfort and personal enjoyment.

In a first aspect of the invention, a multifunctional dome assembly is provided. The multifunctional dome assembly is characterized by sound isolation and environmental protection without sacrificing live interaction with the intended audience. The dome assembly comprises a dome head piece comprising a base enclosing a space, wherein the base is made of acoustic material configured to provide sound isolation and noise cancellation; on the exterior surface of the base, an exterior assembly is installed; on the interior surface of the base, an interior assembly is installed; and a seal ring, positioned at a bottom edge of the base, configured to adhere to the user to form a close contact, preventing outside air and liquid penetrate into the inside of the dome assembly. The exterior assembly comprises a first microphone, a first speaker, a plurality of sensors and at least a camera; and the interior assembly comprises a second microphone and an earphone and a mount position for a smart device.

In the present invention, the camera, the first speaker, in the exterior assembly, the first microphone communicates to a central communication and control center through a first wired or wireless communication channel. The central communication and control device receives video signals from the camera and transmits the video signal out via a first wired or wireless channel, receives a first audio signal from the microphone and transmits the first audio signal out via a second wired or wireless channel. In the interior assembly, the second microphone communicates to a central communication and control center through a third wired or wireless communication channel and the earphone communicates to a central communication and control center through a fourth wired or wireless communication channel.

In some embodiments of the invention, communication channels are any one of WiFi, bluetooth, cellular network, zigbee, cordless phone channel.

In other embodiments of the invention, the dome assembly comprises an essential head piece, optional body piece and optional additional external support.

In a second aspect of the invention, a method to use the personal dome assembly is described. The method comprising determining on whether to mount an external device inside the personal dome assembly or use the personal dome assembly under WIFI mode to work with another device which stays outside of the personal dome assembly; turning on the personal dome assembly through LEDs and ventilation fans inside the personal dome assembly either manually or automatically; setting up a smart phone mounted inside the personal dome assembly or setting up the central command/control unit to connect with the smart phone via WIFI; starting video calls or phone calls under a mode that the personal dome assembly is soundproof from the environment; switching the personal dome assembly working mode from soundproof to sound transparent, when communicating with someone next to you, to talk freely with other people around a user.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a personal dome assembly with cameras, earphone, microphone, communications and control device, and sensors are described. In some embodiments, the personal dome assembly is a personal dome assembly may be used for sport activities or safety purpose, such as hokey, football, baseball, motorcycle, equestrian, roller blade, ski, snow board and so forth. But most importantly, the present invention discloses and describes a dome head piece, comprising a base enclosing a space, having an interior surface and exterior surface, wherein the base is made of an acoustic material configured to provide sound isolation to a user in a passive manner.

The acoustic material is configured to damp the sound wave significantly from outside to the inside of the device. Sound can be attenuated by a factor of 10 times, 100 times, 1000 times, or even more. The sound attenuation is achieved by method or technology including using a sound attenuation/absorption foam material, special sound attenuation/absorption structure and materials, and/or a vacuum layer or layers, or a combination of such, within the device.

The acoustic materials used for sound absorption can be tailed for soundwaves in the in-field use. The acoustic materials can be configured either for broad working band and low-frequency absorption, or high absorption for a certain waveband at a think thickness. The acoustic materials can be membrane-type, cavity-based, and gradient-index acoustic materials. Impedance matching and conversion or dissipation of energy carried by an incident wave can be used to engineer acoustic materials for sound absorption. The acoustic materials can be mixed with additive materials to form desired shapes.

In some variations, membrane-type acoustic materials used. The member-type acoustic materials are elastic membranes embedded within masses, which form spring-mass systems. In one example absorber consisting of an elastic membrane decorated with asymmetric rigid platelets. The absorb sound at 100-1,000 Hz and the corresponding sound wavelengths (340-3,400 mm).

In other variations, the acoustic materials are provided with solid scatterers. The acoustic materials are solid-solid composite with characteristic structures solid regular structures. The solid scatterers could be used for sound attenuation in a specific frequency range. To enhance the AM sound absorption based on solid scatterers, the combination of AMs and other absorbing material could be effective and feasible. For example, embedding steel spheres into porous foam could improve low-frequency sound absorption. Addition of perforated shells for acoustic materials can exhibit high absorption levels. Crystal filling fraction, scatterer's coating layer, and type of backing. can be further tuned to sound absorption. Wherein the layer design and solid scatters are fabricated using 3D printing.

Figure 10:
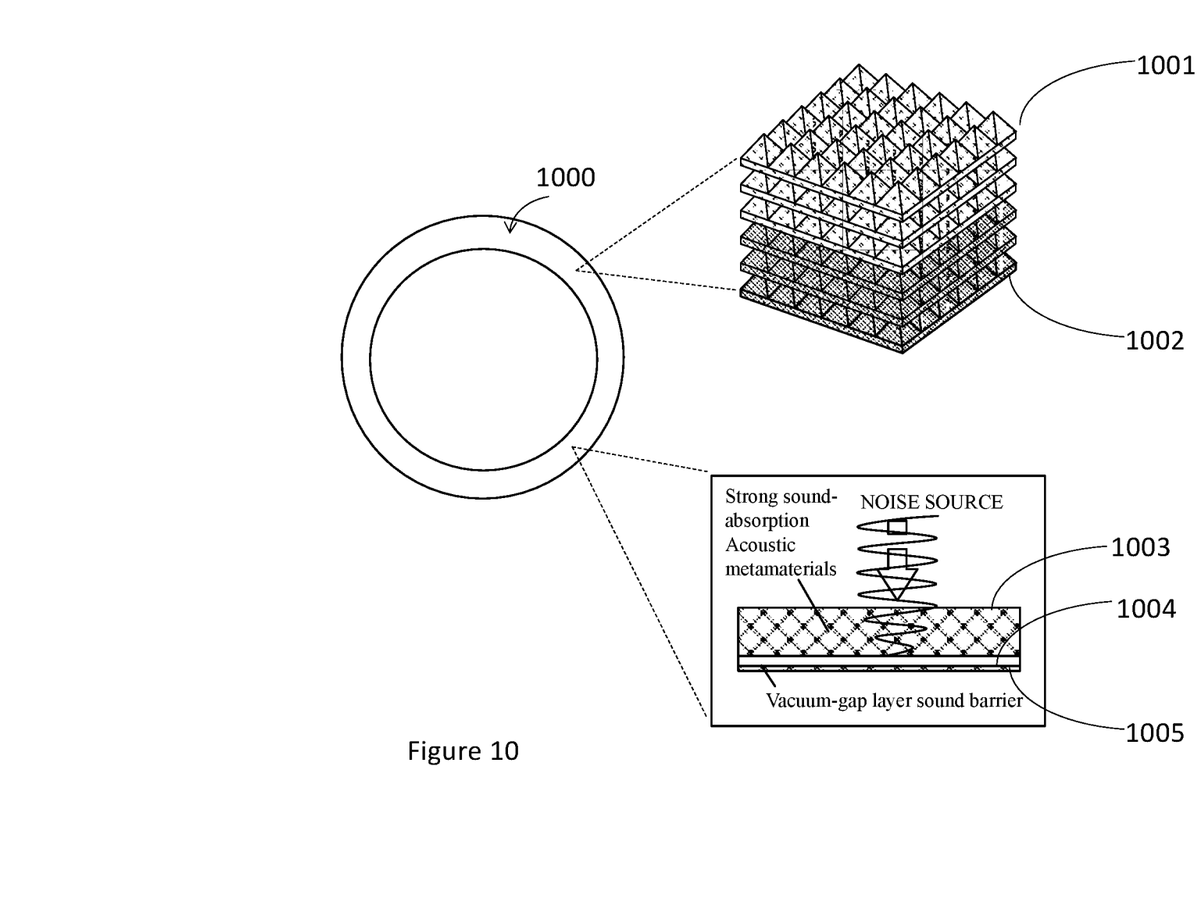
FIG. 10 is a schematic illustration of a two layer layout of embodiments of the base of the personal dome assembly in accordance with some in accordance with some examples of the present invention.

Referring to FIG. 10 of the present invention, in one example, the base material for the dome head piece has two layers. The first layer has a first acoustic material with solid scatters and the second layer has a second acoustic material with solid scatters. In another example, the base material has a vacuum gap sandwiched between two acoustic metamaterial layers, wherein the metamaterial layer opposing to the incoming sound wave has a greater thickness than the other layer.

The sound isolation provided by the base is a two-way sound cancelation. The noise or unintended sound signal cannot travel from outside to the inside of the dome assembly, at the same time, the voices and conversation at inside of the dome cannot escape to the outside. For a user to hear sound from outside and speaker to the outside an earphone and a microphone must be installed. Privacy is greatly enhanced when this dome assembly is used as a primary communication vehicle. A secure and personal office space is provided where and whenever, if the dome assembly is carried around. A user can on train, on bus, in your noise office, in public, in airport, in someone's home, whenever and wherever a moment of privacy or silence is needed and/or do not want to be disturbed and/or disturb others. The personal dome assembly is truly a private terminal to make video/voice calls and talk to friend.

In the present invention, the personal dome assembly is configured to be portable. The personal dome is made of light weight material and the total weight is less than 1-5 lbs. In one example, the dome head piece is less than 1 lb. In another example, the dome head piece is less than 2 lbs. Some embodiments of the personal dome assembly are illustrated in FIGS. 1-3.

Figure 1:
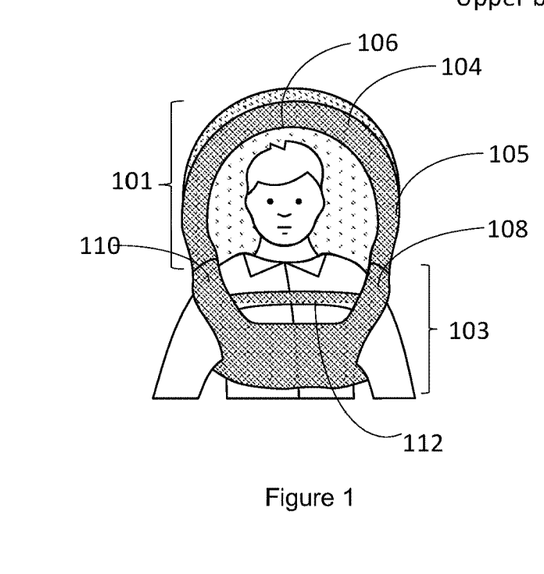
FIG. 1 is a schematic illustration of one embodiment of a personal dome assembly, having both a head piece and body piece, in accordance with some examples of the present invention.

FIG. 1 depicts a personal dome assembly having a head piece 101 and body piece 103 including a chest piece and shoulder piece. The head piece is substantially circular surrounding a user's head. The head piece comprises an interior surface 106 and an exterior surface 105. The head piece also features two seal bands 108 which will restrict the sound and air exchange from the outside to inside of the dome assembly, or vice versa. The shoulder piece 110 of the dome assembly secured on a person's should to bear the weight whereas the chest piece 112 of the dome assembly will keep the weight of head piece balanced.

Figure 2:
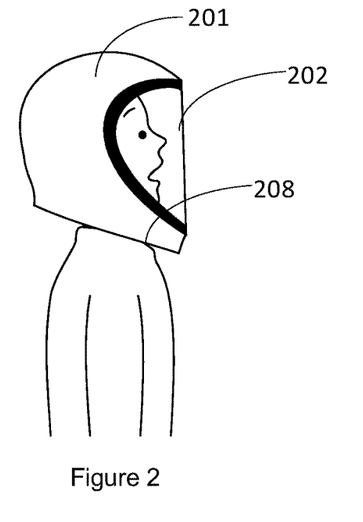
FIG. 2 is a schematic illustration of another embodiment of a personal dome assembly, having only a head piece, in accordance with some examples of the present invention.

FIG. 2 depicts a personal dome assembly 210 having only a head piece. This embodiment of head piece features a transparent front window 202 and bottom seal 208. The front transparent window maybe lifted to open and close, breaking and maintain the sound proof of the personal. The transparent window is reset on a rubber seal purpose of sealing different types of sound and air flows. Further the edge of the front window may be inserted into the grooves or cavities of the system, so the rubber seal can deform to prevent any air or sound from escaping.

Figure 3:
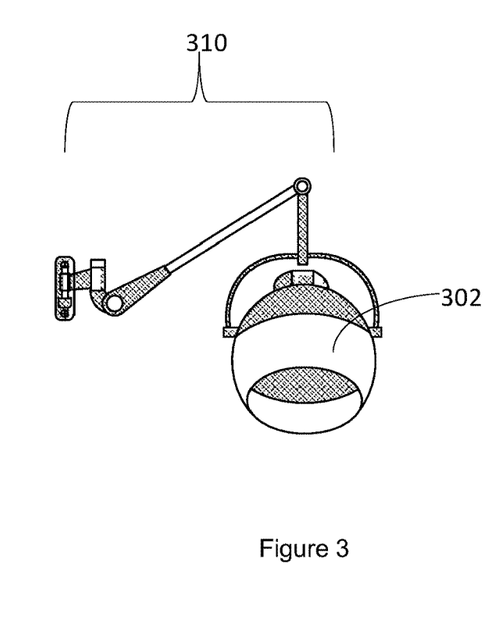
FIG. 3 is a schematic illustration of still another embodiment of a personal dome assembly, a head piece is supported by an external structure, in accordance with some examples of the present invention.

FIG. 3 depicts a personal dome assembly 310. The personal dome assembly 310 is supported from an external wall piece, it has a connecting arm allowing raising and lowing the head piece. The head piece is further secured on a horizontal beam allow the head piece to rotate front to back allowing easy access. This design of the personal dome illustrated a personalize miniaturized phone booth.

Figure 4:
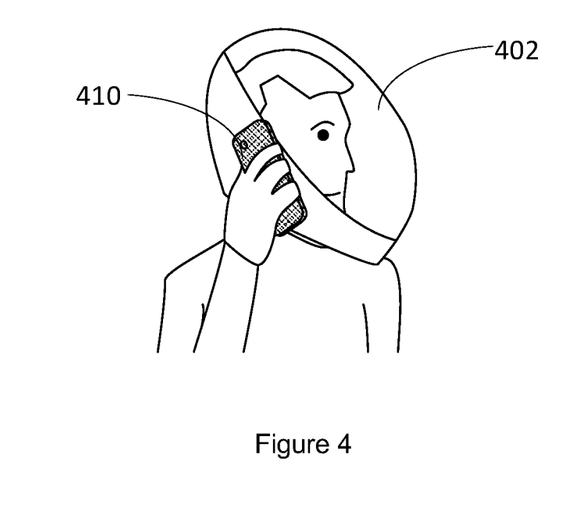
FIG. 4 is a schematic illustrating one in-use configuration in a conventional way for the personal dome assembly in accordance with some examples of the present invention.

FIG. 4 (FIG. 4) is another schematic illustration a personal dome assembly in accordance with some embodiments in an in-use condition, wherein a person can answer phone through an earphone, and communicate through a speaker and microphone pair in a conventional way. Additionally, as shown by FIG. 4, the personal dome assembly of the present invention looks similar to any of conventional personal dome assemblies when looking at it from outside. In one embodiment, the personal dome assembly has a hard cover for most part of a head and a transparent cover for facial part, and there are soft cushion parts under the hard cover such as foam paddings in addition to the base made of acoustic materials, so the personal dome assembly can protect the head from injury caused by mechanical strikes.

Figure 5:
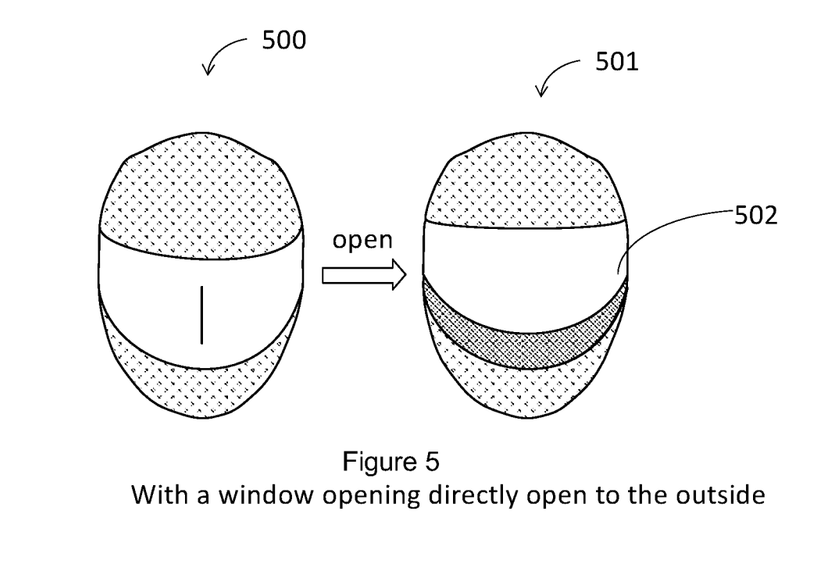
FIG. 5 is a schematic illustration of an embodiment of the personal dome assembly in open and close configurations in accordance with some examples of the present invention.

Furthermore, there are a variety way the personal dome assembly can be designed to have robust sound functionalities and aesthetic appearance. Referring to FIG. 5, the personal dome assembly has tightly fitted top and bottom part of the head of a user and the transparent window opens and closes in a double panel manner. The double panel window can open retractable into two side pockets. When the two windows close, a seal pad provided to form a hermetical sealing preventing outside air, and sound to penetrate into the inside of the dome head piece.

Figure 8:
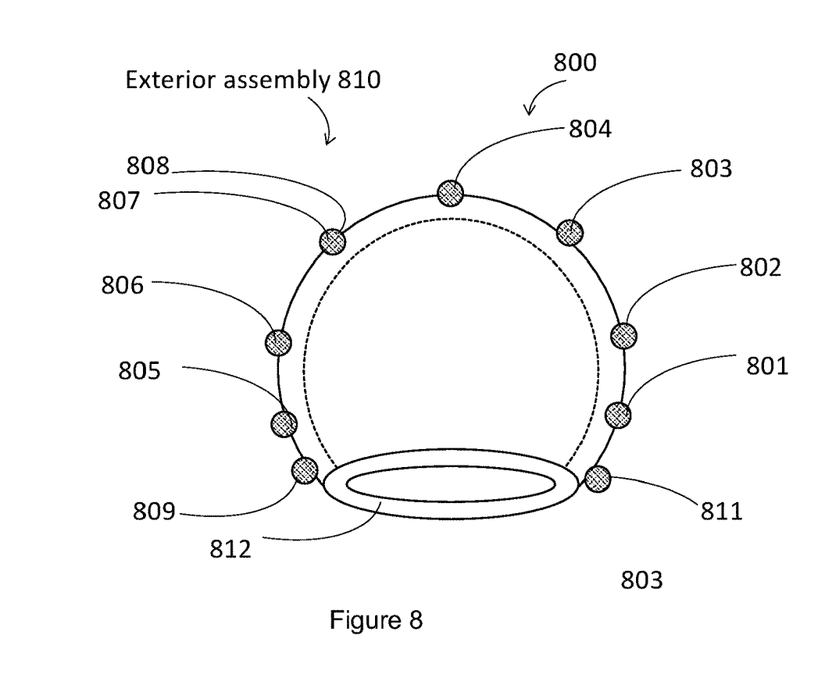
FIG. 8 is a schematic illustration of structural components of an embodiment of exterior assembly of the personal dome assembly, wherein the relative positions of the components are illustration purposes, in accordance with some examples of the present invention.
Figure 9:
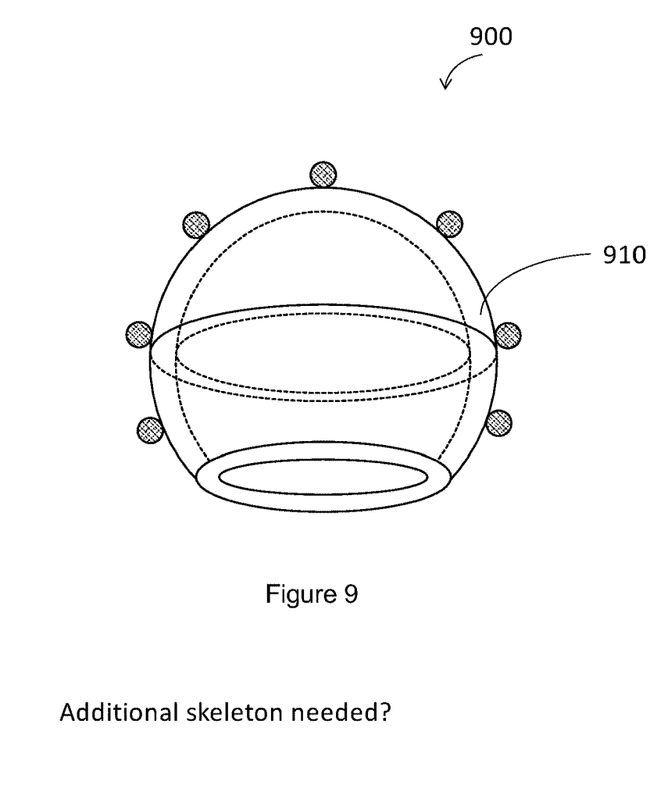
FIG. 9 is a schematic illustration of structural components of another embodiment of the personal dome assembly in accordance with some in accordance with some examples of the present invention.

Because the personal dome is capable of isolating inside environment from outside environment, referring to FIGS. 8, 9, 10, 11 and 12, additional elements such as filters, sensors, cameras can be added to enhance the air and ambient control and interactive features of the dome assembly. FIGS. 8 and 9 depict elements of the outside assembly, power supply 801 is placed at the corner of the base so that it is easily accessible. A first speaker 802 and first microphone 806 are provided on the lower half the dome assembly near the height or vertical elevation of the ear and mouth. A first sensor 803 and first camera 804 are provided in the top half of the base so that its detection region is broad and won't be easily obstructed. Additional sensors 807 and microphones 808 are provided for help construct a holistic view. On-Off switches as sensors or manual switches are disposed near the ends of the base for convenient access purpose.

The personal dome assembly can be added an additional air filter. Said filter is configured to remove virus like COVID-19, or other chemical and biological toxins. A miniaturized fan or any equivalent can be added at the entrance of air channel inside of the personal dome to improve air circulation or adjust temperature/humidity inside the personal dome. Air circulation inside the device and venting channels with outside to provide fresh air and prevent fogging/condensation on either interior or exterior surfaces. Venting and air circulation includes air filtering to prevent biological hazard, chemical hazard, air pollution, dust, haze, virus and other type of unhealthy airborne particles/molecules with size from sub-micron to millimeters. By installing the filter for air, in one instance 90% of the particles are removed. In another instance 99% of the particles are removed. In another instance 99.9% of the particles are removed. In still another instance, 99.99% or more of the particles are removed.

The present invention can not only help a user during COVID-19 pandemic, it may also help with someone with chronic respiratory issues. For example, reducing hay fever for the month of spring. More important, although the present invention is not dedicated to design a miner's helmet to meet the safety standard of underground workers but the personal dome assembly comprise an impact sensor to sense the impact and external cover can be made of impact resistant materials. Carrying around the personal dome assembly not only provide a private office environment but adding safety measures to combat unprecedent situations like sudden smoke, car accident, and earthquake or any other hazardous environment. The personal dome assembly is designed to be shock and/or other physical collision/bombard proof to protect the head and the covered human body parts from physical damage during the shock and/or collision.

Referring FIG. 8, the elements are: 800 another embodiment of a dome assembly; 801 power supply or power connection means; 802 first speaker; 803 a first sensor; 804 a first camera; 805 LED; 806 first microphone; 807 a second sensor; 808 a second camera; 809 On-Off switch for communication; 810 an embodiment of exterior assembly; 811 On-Off switch for air supply; and 812 seal ring. The seal ring 812 is provided to form contact with circumference of a user's head or neck to form a hermetical seal.

Referring to FIG. 1 and FIG. 9, optionally or preferably, additional body piece or additional structural or skeleton support are provided. Such additional mechanical design, will further improve the comfortability to meeting more ergonomic requirement.

The sensors described in FIGS. 8 and 9 include but are not limited by temperature sensor, pressure sensor, image sensor/recognition, chemical sensors, bio-sensors, distance sensing, cameras, laser sensors, LIDAR sensors, Gyroscope sensors, Radar sensors, and any combinations of them.

In another aspect of the invention, the personal dome assembly further comprises an impact sensor configured to detect mechanical impact force received by the personal dome assembly and connected to the communication and control device. In another aspect of the invention, the communication and control device receives impact detection result from the impact sensor then transmits out the impact detection result via any one of the first wireless channel and the second wireless channel.

In another example of the invention, the communication and control device receive the impact detection result from the impact sensor, and the communication and control device instruct the earphone to send out audio alarm if the impact detection result reaches a threshold. In another example of the invention, the personal dome assembly further comprises an alarm means connected with the communication and control device. The communication and control device instructs the alarm means to send out alarm by visible light signal if the impact detection result reaches a threshold.

In some examples of the invention, the impact senor comprises one or more of accelerometer, piezo electric sensor and microelectromechanical system.

On-Off switch to shut off the inside and outside in terms of sound communication and On-Off switch to shut off the inside and outside in terms of air flow can also be accomplished by position, location or voice sensors. The personal dome assembly disclosed herein is configured to work in two in-use configurations, an Inside Communication Mode and Outside Communication Mode. The Inside Communication Mode means a privacy mode which prevents inside sound/voice to be heard from the outside and isolate/attenuate outside sound and noise. The Outside Communication Mode means freely talk to or communicate with outside without any hinderance.

In some variations, in addition to actual On-Off switches, additional position sensors can be installed to detect the actual intended in use configurations and send instructions through central communication and control center. Further, in an advanced intelligent version, heuristics can be used to determine a best mode in use configuration to save battery life and long term device lifetime. Interactive features regarding changed of mode or best mode, in forms of alert messages, alarming signals, through texts, LED indicators or others can be stored and sent through central communication and control center.

In other variations, the sound transparent and sound proof modes can be switched using voice command, or instructions from an external device from iPhone and a laptop.

Referring to FIG. 4, a user wearing the personal dome device can break the sound proof by a voice command and answer a phone externally through microphone from inside. Alternatively, the external device, a smart phone in this illustration, can be linked to the central communication and control unit of the personal dome assembly, which is in turn linked to the microphone and speaker of the personal dome, a person answering the phone does not need to take on the phone while holding the phone as shown in FIG. 4.

Figure 6:
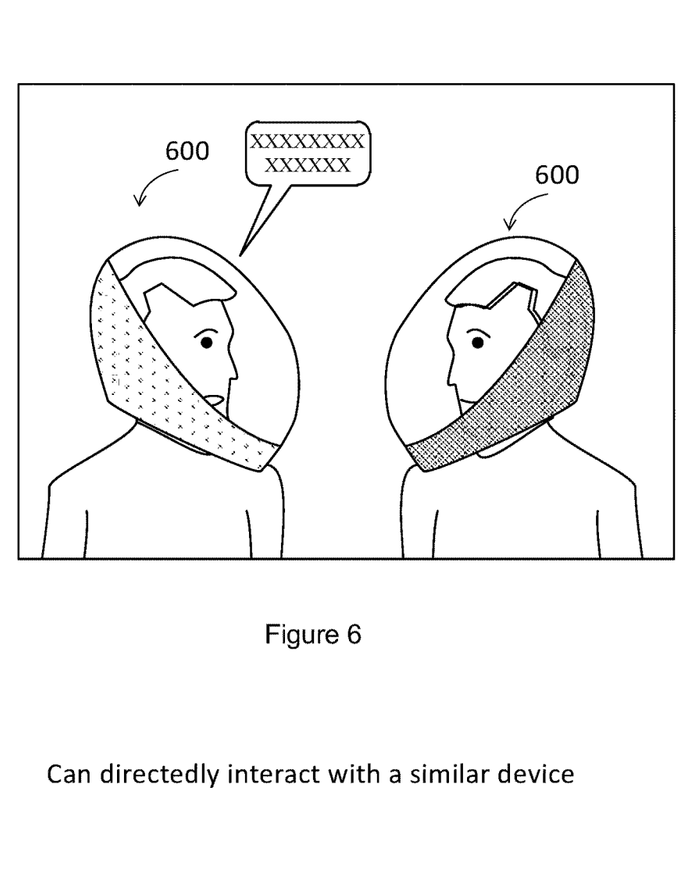
FIG. 6 is a schematic illustration of an in-use configuration of an embodiment of the personal dome assembly, wherein both users can communication to each other in accordance with some examples of the present invention.
Figure 7:
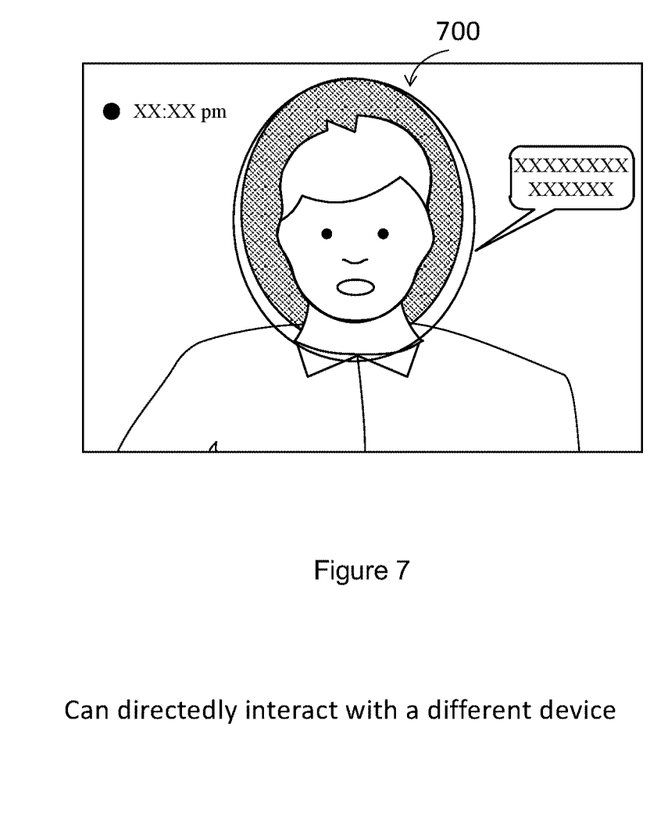
FIG. 7 is a schematic illustration of an in-use configuration of an embodiment of the personal dome assembly, wherein both users can communication to each other in accordance with some examples of the present invention.

Referring to FIG. 6, two users in sound proof mode wearing their individual personal dome assemblies can interact with each other without heard by a third party without to be in the conversation. Referring to FIG. 7, one user in sound proof mode wearing the personal dome assembly can privately transmit his voice to the computer without being heard by the environment in the sound proof mode.

Figure 11:
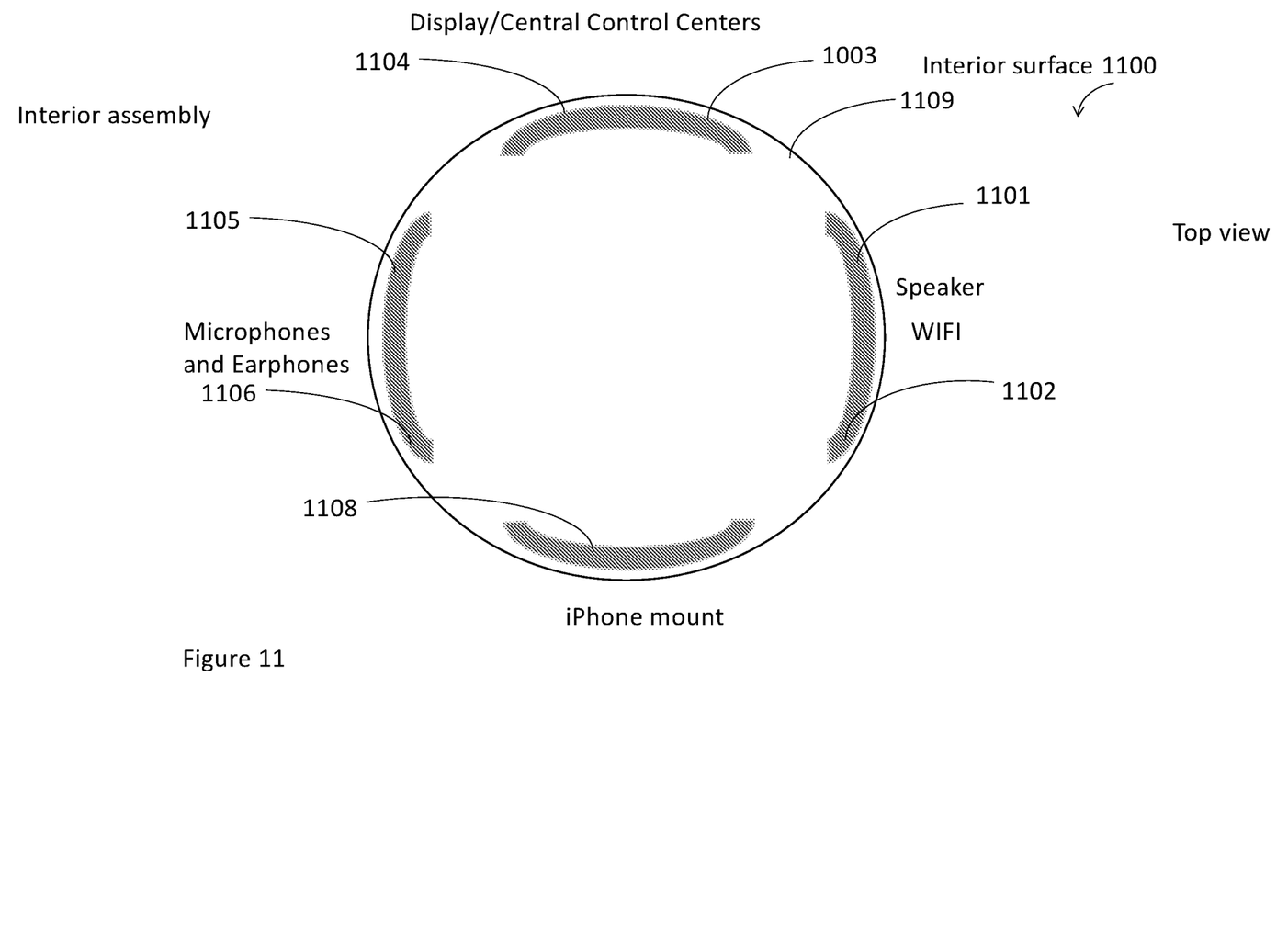
FIG. 11 is a schematic illustration of interior surface of embodiments of the base of the personal dome assembly in accordance with some in accordance with some examples of the present invention.
Figure 12:
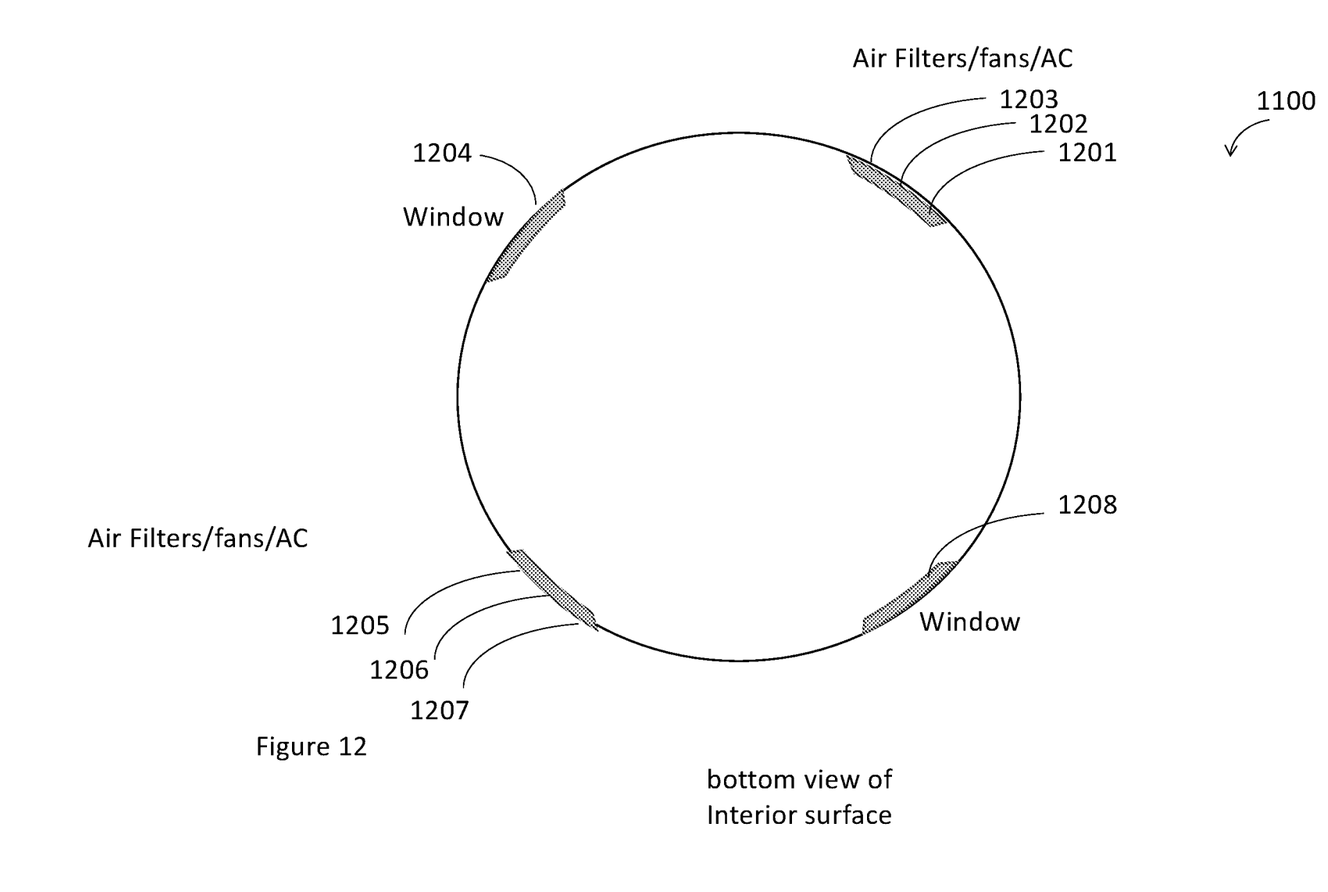
FIG. 12 is a schematic illustration of interior surface of embodiments of the base of the personal dome assembly, including additional elements in accordance with some in accordance with some examples of the present invention.
Figure 13:
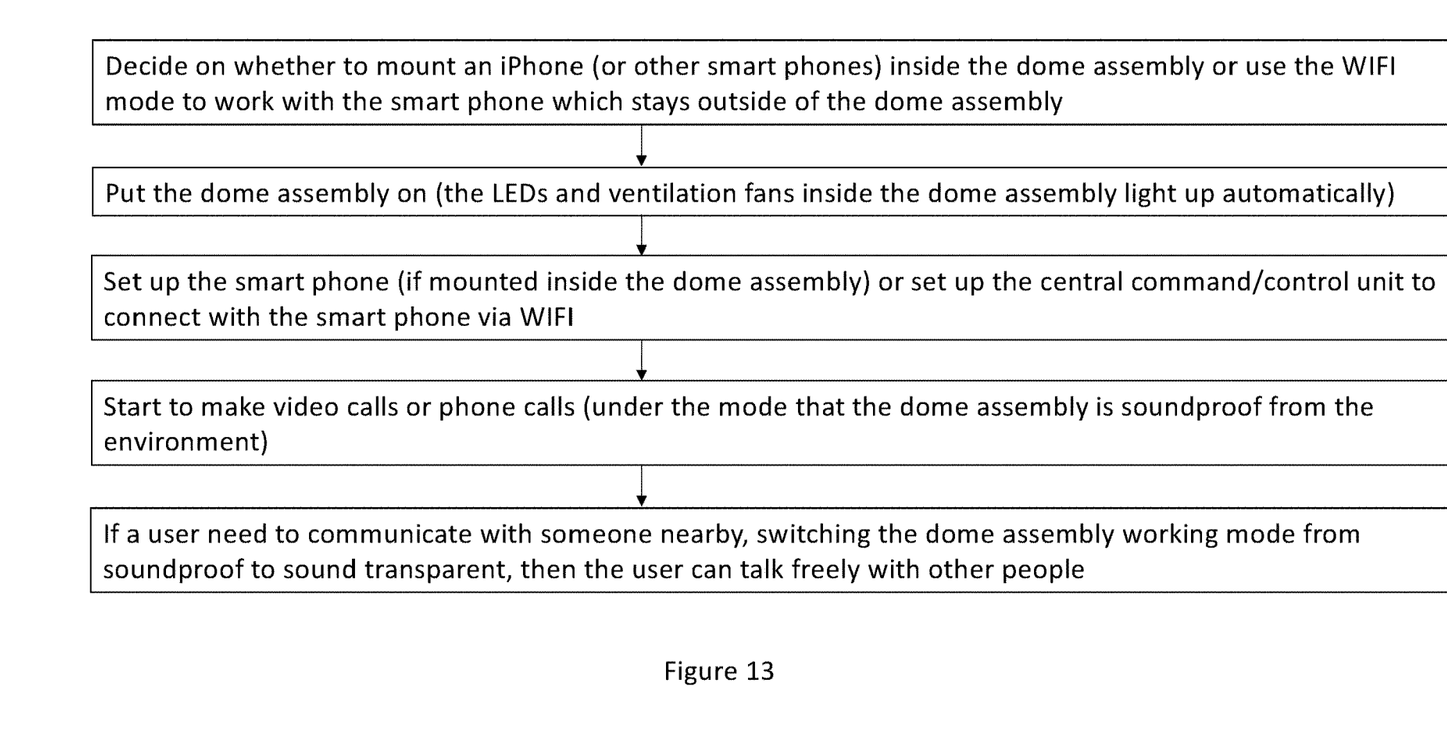
FIG. 13 is a schematic illustration method flow diagram of the process steps in accordance with the aspects of the present invention.

Referring to FIG. 11, the interior assembly of the personal dome assembly comprises a speaker 1101, a central control center or a central communication control center 1003, display 1104, microphone 1105 and earphone 1106, and smart phone mounting attachment 1108. In the present invention, the display is distanced at 2-20 cm away from a center of the display screen to the center of the two eyes. In some embodiments, the edges of the display curves as the dome head piece curves. The longest dimension of the display is selected from 4 in, 4.7 in, 5.4 in, 5.5 in, 5.8 inch, 6.1 in, 6.7 in. In a preferred embodiment the display is configured to provide a virtual reality experience to the user along with synchronized sensors and sound effects. In said embodiment, the display is positioned as close as it comfortably allowed to create a virtual reality experience to the user. Consequently, the mounting attachment element 1108 is positioned across from the display in a top view, and the mounting attachment configured Referring to FIGS. 11 and 12, earphone 1106 and speaker 1101 is also positioned opposite from each other.

Figure 14:
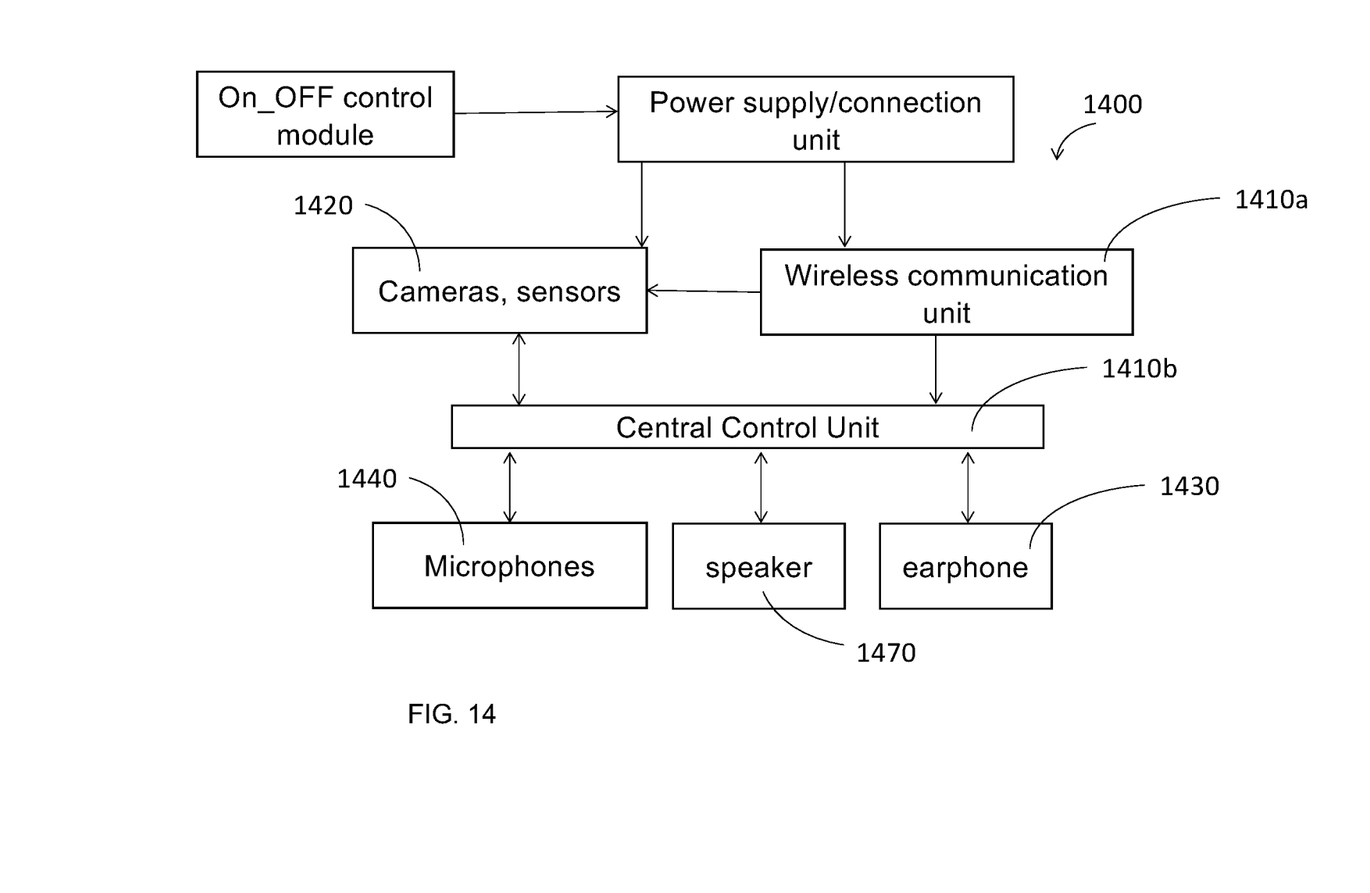
FIG. 14 is a schematic illustration of one embodiment of the interactive features of the dome assembly.

FIG. 14 shows one embodiment of the interactive features of the dome assembly. The block diagram illustrating different parts in the personal dome assembly in accordance with some embodiments. According to FIG. 14, personal dome assembly comprises a camera 1420, an earphone 1430, a microphone 1440 and a wireless communication unit 1410a and central control device 1410b. And communication and control device 1410, which is connected with camera 1420, earphone 1430 and microphone 1440, and the connection can be made one or more wireless communication channel. The central communication and control device 1410 receives video signals from camera 1420 and transmits the video signal out via a first wireless channel, receives a first audio signal from microphone 1440 and transmits the first audio signal out via a second wireless channel, and receives a second audio signal via the second wireless channel and transmit the second audio signal to earphone 1430.

In one embodiment of the invention, earphone 1430 is embedded at an inner personal dome assembly part, which is corresponding to position of personal dome assembly wearer's ear. And earphone 1430 can be embedded into inner padding part of personal dome assembly 1400, or can be installed in a hole on inner padding part of personal dome assembly 1400. Although not illustrated explicitly in the drawings, it should be understood that earphone 1430 can be a single device installed at one inner side of personal dome assembly 1400, or a pair of devices installed at both inner side of personal dome assembly 1400 respectively.

In one embodiment of the invention, microphone 1440 is embedded or installed at the inner personal dome assembly part which is close to position of personal dome assembly wearer's mouth, such that personal dome assembly wearer's voice can be easily picked up.

In one embodiment of the invention, camera 1420 is embedded or installed on the personal dome assembly outer cover, for example, at the forehead part of the personal dome assembly outer cover. Camera 1420 is arranged or installed so that no part of camera 1420 protrudes or extend outside of outer cover personal dome assembly 1400, then when something strikes on the part of outer cover of personal dome assembly 1400 where camera 1420 is installed, camera 1420 won't be damaged.

In one embodiment of the invention, wireless communication unit 1410a and central control device 1410b are embedded or installed at inner part of personal dome assembly 100, for example, are surrounded by additional such that it can be protected from mechanical damage due to strikes.

Earphone 1430, microphone 1440 and camera 1420 are all connected to communication and control device 1410 via wire connections.

It should be understood that communication and control device has at least a processor with programs to carry on all necessary functions of the invention, and a communication means which can make wireless communications using many wireless communication methods including but not limited to WIFI, Bluetooth, cellular network, ZigBee, and cordless phone channel. Particularly, communication unit 1410a and central control device 1410b can use any of wireless communication method to communicate with other counterparts through the communication means.

It should be understood that when talking about different wireless channels in present invention, in most of time, it means different wireless communication methods including but not limited to WIFI, Bluetooth, cellular network, ZigBee, and cordless phone channel. Therefore, in one embodiment of the invention, the first wireless channel is one of WIFI, Bluetooth, cellular network, ZigBee, cordless phone channel, and the second wireless channel is the other one of WIFI, Bluetooth, cellular network, ZigBee, cordless phone channel.

For example, communication and control device 1410 receives video signals from camera 1420 and transmits the video signal out via a first wireless channel such as WIFI, receives a first audio signal from microphone 1440 and transmits the first audio signal out via a second wireless channel such as Bluetooth, and receives a second audio signal via the second wireless channel such as Bluetooth and transmit the second audio signal to earphone 1430.

In another example, communication and control device 1410 receives video signals from camera 1420 and transmits the video signal out via a first wireless channel such as cellular network, receives a first audio signal from microphone 1440 and transmits the first audio signal out via a second wireless channel such as cordless phone channel, and receives a second audio signal via the second wireless channel such as cordless phone channel and transmit the second audio signal to earphone 1430.

In one embodiment of the invention, the first wireless channel and the second wireless channel is a same wireless channel. That is, communication and control device 1410 uses one wireless channel to transmit the video signal out of personal dome assembly 1400 and to transmit audio signal out of personal dome assembly 1400 and receive audio signal from outside of personal dome assembly 1400.

In one embodiment of the invention, the same wireless channel is any one of WIFI, Bluetooth, cellular network, ZigBee, cordless phone channel. For example, communication and control device 1410 uses WIFI to transmit the video signal out of personal dome assembly 1400 and to transmit audio signal out of personal dome assembly 1400 and receive audio signal from outside of personal dome assembly 1400. In another example, communication and control device 1410 uses cellular network to transmit the video signal out of personal dome assembly 1400 and to transmit audio signal out of personal dome assembly 1400 and receive audio signal from outside of personal dome assembly 1400.

In one embodiment of the invention, communication and control device 1400 receives and transmits a first audio signal and a second audio signal in a way to enable full duplex audio communication. In an example, a first audio signal is the audio signal from microphone 1440 and a second audio signal is the audio signal received wirelessly by communication and control device 1410. In an example, communication and control device 1410 uses Voice over IP technology and WIFI to make communication with a terminal, such as a mobile phone, for the audio signals, such that wearer of personal dome assembly 1400 and the terminal user can talk in a duplex way. In another example, communication and control device 1410 can use cordless phone channel or Bluetooth to make duplex audio communication wireless for a personal dome assembly wearer and a terminal user.

In an example of the invention, a first audio signal is generated by microphone 140 after collecting voice of wearer of personal dome assembly 1400, then microphone 1440 transmits the first audio signal to communication and control device 1410, next, communication and control device 1410 transmits the first audio signal via a wireless channel to a terminal such as a mobile phone, then the terminal generates sound at its speaker according to the first audio signal, such that the terminal user can hear the voice of wearer of personal dome assembly 1400. At the same time, the terminal generates a second audio signal according to voice received by its microphone, then the terminal transmits the second audio signal via a wireless channel to communication and control device 1410 of personal dome assembly 100, then communication and control device 1410 transmits the second audio signal to earphone 1430, next, earphone 1430 generates sound according to the second audio signal, such that wearer of personal dome assembly 1400 can hear the voice of the terminal user. Therefore, wearer of personal dome assembly 1400 and the terminal user can talk to and hear each other at the same time, that is, duplex audio communication.

FIG. 14 is a block diagram illustrating different parts in the personal dome assembly in accordance with some embodiments. As shown in FIG. 14, in one embodiment of the invention, personal dome assembly 100 further comprises alarm means 1460 connected with communication and control device 1410, and communication and control device 1410 can instruct alarm means 1460 to send out alarm by visible light signal if the impact detection result reaches a threshold.

In an example, alarm means 1460 is a light source, such as a LED, installed on outer cover of personal dome assembly 1400, and alarm mean 1460 can emit visible light continuously or in a flashing fashion when activated or turned on, such that its light emitting or flashing can be recognized by bare eye in a distance such as 50 meters/150 feet or more.

In an example, communication and control device 1410a and 1410b receive the impact detection result from impact sensor 150 then determine whether it reaches a threshold, and alarm means 160 is activated or turned on if the threshold is reached. Wearer of personal dome assembly 100 or other appropriate personal can set the threshold in advance.

In one embodiment of the invention, impact senor 1450 comprises one or more of accelerometer, piezo electric sensor and microelectromechanical system (MEMS). In an example, the accelerometer is a 6-axis accelerometer. It should be understood, communication and control device 1410a and 1410b can make good calculation about how much mechanical impact force received by personal dome assembly 1400 according to acceleration reading provided by the accelerometer.

In one example of the invention, personal dome assembly 800 comprises a power supply means 801. A power source separated from personal dome assembly 800 can be connected to communication and control units via power connection means 801.

In an example of the invention, a power source such as a battery is equipped in personal dome assembly 800 to supply power to communication and control units, then communication and control units can supply power to other electronic components in personal dome assembly 800, such as camera 804, microphone 806, and earphone 1106. In another example, no power source is equipped in personal dome assembly 800, then power connection means 801, such as a power line with a connector (USB connector for example), is provided at personal dome assembly 800, such that a separate power source can be connected to communication and control units 14 to supply power via power connection means 801.

In an example of the invention, a battery pack can be connected to power connection means 801 using USB connector, then the battery pack can be carried by wearer of personal dome assembly 800 at other part of his/her body, such as in his backpack or in bag hanging at his/her belt.

In one example of the invention, personal dome assembly 800 comprises speed meter sensor 807. Speed meter 807 measures speed of the personal dome assembly 800 and send the speed measurement result to communication and control device 1410a. Communication and control device 1410b transmits out the speed measurement result via any one of the first wireless channel and the second wireless channel.

In an example, after the speed measurement result is generated, sensor meter 807 or 1420 sends it to communication and control device 1410b. At communication and control device 1410b, it continuously receives the sensor measurement result from speed meter 1420, then communication and control device 1410b can continuously send out the sensor measurement result via any one of the first or second wireless channel. And, at other end of the wireless channel, a terminal, such as a mobile phone, continuously receives the sensor measurement result. The terminal can continuously display then sensor measurement result on its screen. Alternatively, the terminal can continuously display the sensor measurement result on its screen together with video obtained from the video signal received from communication and control device 1410a of personal dome assembly 1400. Alternatively, communication and control units 1410a and 1410b can continuously embed the sensor measurement result into video signal which it is going to sends out wirelessly, for example by overlying then speed measurement result as a number shown on video image, then when a terminal receiving the video signal displays video derived from the video signal, the speed measurement result is automatically shown on the video screen.

Alternatively, communication and control device 1410 may not send out then sensor measurement result continuously, in contrast, communication and control device 110 sends out sensor measurement result through wireless channel only if it is determined that the speed measurement result reaches a threshold which can be set as needed. Therefore, once a terminal, such as a mobile phone, receives the speed measurement result through wireless channel it can inform related personal to take necessary actions.

In a second aspect of the present invention, a method of using a personal dome device is described. The method comprises steps of determining on whether to mount a smart phone inside the personal dome assembly or use the personal dome assembly under WIFI mode to work with another device which stays outside of the personal dome assembly; turning on the personal dome assembly through LEDs and ventilation fans inside the personal dome assembly light up manually or automatically; setting up the smart phone (if mounted inside the personal dome assembly) or setting up the central command/control unit to connect with the smart phone via WIFI; starting video calls or phone calls (under the mode that the personal dome assembly is soundproof from the environment); switching the personal dome assembly working mode from soundproof to sound transparent, when communicating with someone next to you, then you can talk freely with other people around you.

Further, the personal dome assembly is configured to be portable on cars, buses, trains, even air planes to set up a secure soundproof working environment anywhere and anytime. The method of using further comprises projecting camera images taken on top of the personal dome assembly onto the display(s) inside the personal dome assembly, so a user can observe surrounding environment.

The method of using further comprises conducting a voice call while walking when a radar sensor to alert a user are approached by and approaching to an object. The method of using further comprises turning on personal dome assembly by voice command; recording and storing a voice meeting by digital memory.

The central communication and control unit comprises a medium to execute the program stored thereon.

Elements in this invention are:
101 Head piece;
103 Body piece;
104 base of the dome assembly;
105 exterior surface;
106 interior surface;
108 seal band;
110 shoulder piece;
112 chest piece;
201 a head piece;
202 window;
310 external support assembly;
302 head piece;
402 head piece;
410 external device;
500 an embodiment of a dome assembly in close configuration;
501 the embodiment of the dome assembly in open configuration;
600 another embodiment of a dome assembly;
700 another embodiment of a dome assembly;
800 another embodiment of a dome assembly;
801 power connection means;
802 first speaker;
803 a first sensor;
804 a first camera;
805 LED;
806 first microphone;
807 a second sensor;
808 a second camera;
809 on-off switch for communication;
810 an embodiment of exterior assembly;
811 on-off switch for air supply;
812 seal ring;
910 horizontal support;
900 another embodiment of exterior assembly;
1000 base;
1001 first layer of base;
1002 second layer of base;
1003 another first layer of base;
1004 Vacuum layer;
1005 bottom layer of base;
1100 interior assembly;
1101 a second speaker;
1102 WIFI;
1103 central control center;
1104 display;
1105 microphone;
1106 earphone;
1108 a mount adapter for a smart phone;
1109 interior surface;
1201 air filter;
1202 fan;
1203 temperature control;
1204 a first window;
1205 air filter;
1206 fans;
1207 temperature control;
1208 another window;
1400 another example of personal dome assembly;
1410a wireless communication unit;
1410b central control unit;
1420 cameras and sensors;
1430 earphone;
1440 microphones.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

The invention claimed is:

1. A personal dome assembly, comprising
a dome head piece, comprising
a base enclosing a space, having an interior surface and exterior surface, wherein the base is made of an acoustic material,
comprising two-layer metamaterials, including a first layer with a first acoustic material and a second layer with a second acoustic material,
adapted to attenuate sound inside and outside of the personal dome assembly by a factor more than 10 times,
configured to provide sound isolation as a two-way sound cancellation for a user to eliminate sound leak from the interior space of the personal dome to an exterior space of the personal dome and vice versa in a passive manner;

on the exterior surface of the base, an exterior assembly is installed including a first microphone, a first speaker, a plurality of sensors and at least a camera are embedded;

wherein the first microphone is configured to convert exterior audio signal to a first electrical signal and transfer it to inside of the personal dome assembly;

the first speaker is configured to transfer inside second electrical signal to an external voice signal;

the plurality of sensors are selected from a temperature sensor, pressure sensor, image sensor, a chemical sensor, bio-sensor, distance sensing, laser sensor, LIDAR sensor, gyroscope sensor, and radar sensor;

the camera is installed on a top of the dome head piece, configured to capture a 360-degree view of outside environment to the dome head piece;

on the interior surface of the base, an interior assembly is installed, comprising a second microphone and an earphone are embedded and a mount member for a smart device is provided;

a seal region, positioned at a bottom edge of the base, configured to adhere to the user to form a close contact, preventing outside air and liquid penetrate into the dome head piece;

a LED indicator to indicate if a meeting is in session or the user want to be disturbed;

a power supply configured to provide power to both the exterior assembly and interior assembly.

2. The personal dome assembly of claim 1, wherein the dome assembly further comprises a material, capable of actively canceling a noise.

3. The personal dome assembly of claim 1, wherein the acoustic material for the base is selected from a sound absorption foam material, an engineering material having a sound attenuation structure, a vacuum layer sandwiched between the interior surface and exterior surface, or a combination of them.

4. The personal dome assembly of claim 1, wherein the acoustic material is capable to attenuated sound inside and outside of the personal dome assembly by a factor more than 100 times.

5. The personal dome assembly of claim 1, further comprises a first On-Off switch or a switch sensor, turning on and off a sound communication between inside and outside of the dome head piece.

6. The personal dome assembly of claim 1, further comprises an air circulation and ventilation channel embedded on the interior surface configured to provide a fresh air and prevent condensation on the interior surface.

7. The personal dome assembly of claim 1, further comprises a second On-Off switch or position sensor, turning of and off an air flow of the air supply.

8. The personal dome assembly of claim 1, further comprises a central control center, collecting information and signals from and send out instructions to the plurality of sensors, the camera, the first microphone, the first speaker, the second microphone and the earphone and communicating to another central control center of another personal dome assembly.

9. The personal dome assembly of claim 8, further comprises a display, communicating with the central control center.

10. The personal dome assembly of claim 8, further comprising a temperature control unit regulating temperature through air in an air circulation and ventilation channel the interior of the dome assembly.

11. The personal dome assembly of claim 6, wherein the air circulation and ventilation channel further equipped with a filter configured to prevent biological hazard, chemical hazard, air pollution, dust, haze, virus and other type of unhealthy airborne particles/molecules with size from submicron to millimeters.

12. The personal dome assembly of claim 6, wherein a distance between the display and eye of the user is adjustable between 0.5-20 cm.

13. The personal dome assembly of claim 1, further comprising a wearable dressing shoulder piece, covering the shoulder of the user when personal dome assembly under in use configuration.

14. The personal dome assembly of claim 13, further comprising an impact resistant material to protect a head and the covered areas from physical damage under a shock or collision condition.

15. The personal dome assembly of claim 1, further comprising an adapter, configured to attach to an external device including smart phones, laptops and digital/electronic devices.

16. The personal dome assembly of claim 1, further comprising a WIFI and Bluetooth, configured to allow a user to take voice calls, video calls directly through the personal dome assembly.

17. The personal dome assembly of claim 1, wherein the first layer of the first acoustic material is provided with a first array of solid scatters and the second layer of the second acoustic material are provided with a second array of solid scatters.

18. The personal dome assembly of claim 1, wherein a vacuum layer is sandwiched between the first layer of the first acoustic material and the second layer of the second acoustic material.

19. The personal dome assembly of claim 17, wherein the first array of solid scatters and thee second array of solid scatters are pyramids shaped or sphere shaped.

* * * * *

UNITED STATES PATENT AND TRADEMARK OFFICE
CERTIFICATE OF CORRECTION

PATENT NO. : 11,134,739 B1  
APPLICATION NO. : 17/213233  
DATED : October 5, 2021  
INVENTOR(S) : Jin et al.

Page 1 of 1

It is certified that error appears in the above-identified patent and that said Letters Patent is hereby corrected as shown below:

On the Title Page

Items (71) and (72) should read:  
Yifei Jenny Jin, Beijing, China;  
Naixin Angela Tang, Beijing, China;  
Liangxi Nick Chen, River Edge, NJ;  
Songhe Bill Shen, Beijing, China;  
Lisa Rousha Wang, Belle Mead, NJ;  
Richard Prince Wang, Belle Mead, NJ;  
Jian Jim Wang, Belle Mead, NJ;  
Qing Ye, Los Gatos, CA.

Item (57) should be replaced with:  
Abstract  
The present invention describes a new multi-functional personal wearable device, creating anywhere a Personal Office at any time. A user can conduct a business meeting while walking in a park or in a piano recital. The device offers a broad variety of essential or prioritized functions and capabilities, including private communication and entertainment, biological, chemical, and virus-protection, and provides interactions with various sensors to enhance our safety and comfortability.

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*